US012449816B1

(12) United States Patent
Bhan et al.

(10) Patent No.: US 12,449,816 B1
(45) Date of Patent: Oct. 21, 2025

(54) DATA-DRIVEN MODELING OF LOW-ALTITUDE TURBULENCE

(71) Applicant: Amazon Technologies, Inc., Seattle, WA (US)

(72) Inventors: Sankalp Kishan Bhan, Seattle, WA (US); Marco Giovanni Giometto, New York, NY (US); Christopher Aden Maynor, Mountlake Terrace, WA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 18/343,453

(22) Filed: Jun. 28, 2023

(51) Int. Cl.
*G06F 7/00* (2006.01)
*G05D 1/00* (2006.01)
*G08G 5/30* (2025.01)

(52) U.S. Cl.
CPC ........... *G05D 1/046* (2013.01); *G05D 1/1062* (2019.05); *G08G 5/30* (2025.01)

(58) Field of Classification Search
CPC ........ G05D 1/1062; G05D 1/046; G01P 5/02; G08G 5/30
See application file for complete search history.

(56) References Cited

U.S. PATENT DOCUMENTS

| | | | | |
|---|---|---|---|---|
| 8,401,726 B2 * | 3/2013 | Bouvier | ................. | G07C 5/006 701/29.4 |
| 8,554,458 B2 * | 10/2013 | Sawhill | ..................... | G08G 5/34 701/120 |
| 8,565,943 B2 * | 10/2013 | Weinmann | ............. | G07C 5/008 348/148 |
| 8,620,714 B2 * | 12/2013 | Williams | ........... | G06Q 10/0637 701/29.3 |
| 2014/0088799 A1 * | 3/2014 | Tino | ........................ | G06F 30/20 703/2 |
| 2017/0323274 A1 * | 11/2017 | Johnson | ............... | G05B 13/041 |
| 2019/0101934 A1 | 4/2019 | Tuukkanen et al. | | |
| 2022/0128996 A1 | 4/2022 | Tsurumi | | |
| 2023/0306857 A1 | 9/2023 | Hayakawa | | |

(Continued)

OTHER PUBLICATIONS

European Centre for Medium-Range Weather Forecasts (ECMWF), available at www.ecmwf.int (last visited Mar. 29, 2024), URL: https://www.ecmwf.int/.

(Continued)

*Primary Examiner* — Masud Ahmed
(74) *Attorney, Agent, or Firm* — Athorus, PLLC

(57) ABSTRACT

Wind velocities at positions within an environment are predicted using stochastic models that consider average wind flows at the various positions and calculate random components of the wind flows (e.g., due to gusts) according to autoregressive functions. One or more time series of wind velocity obtained from any sources may be identified, and distribution functions are fit to the time series. A copula or another multivariate cumulative distribution function determined from a correlation matrix and the distribution functions is used to generate coefficients of the autoregressive functions. Wind velocities at the positions are modeled from the average wind flows and the calculated random components. Decisions on safety or reliability of aerial vehicles for performing missions within the environment are determined from the wind velocities.

20 Claims, 13 Drawing Sheets

(56) References Cited

U.S. PATENT DOCUMENTS

2023/0343226 A1 10/2023 Bieringer et al.
2024/0185731 A1 6/2024 Büddefeld et al.

OTHER PUBLICATIONS

Global Systems Laboratory, "The High-Resolution Rapid Refresh (HRRR)," National Oceanic and Atmospheric Administration, U.S. Department of Commerce, available at URL: https://rapidrefresh.noaa.gov (last visited Mar. 29, 2024).

DeBonis, James R., "WRLES: Wave Resolving Large-Eddy Simulation Code, Theory and Usage," May 2019, NASA/TM-2019-220192 (Year: 2019).

Gao, X-W., et al., "Free element collocation method: A new method combining advantages of finite element and mesh free methods," 2019, Computers & Structures. 215, pp. 10-26 (Year: 2019).

Wang, Biao, "Urban Wind Energy Evaluation with Urban Morphology," (vol. 101). London, UK: IntechOpen (Year: 2020).

Cava, Daniela and Katul, Gabriel G. Spectral Short-circuiting and Wake Production within the Canopy Trunk Space of an Alpine Hardwood Forest. Boundary-Layer Meteorology, 126:415-431, 2008. ISSN 00068314. doi: 10.1007/s10546-007-9246-x. Accessed Mar. 29, 2023, URL: https://nicholas.duke.edu/people/faculty/katul/BLM_Cava_2008b.pdf.

Giometto, M. G., Christen, A., Egli, P. E., Schmid, M. F., Tooke, R. T., Coops, N. C., & Parlange, M. B. Effects of trees on mean wind, turbulence and momentum exchange within and above a real urban environment. Advances in Water Resources, 106:154-168, 2017.

Kolmogorov, Andrei Nikolaevich. The local structure of turbulence in incompressible viscous fluid for very large Reynolds numbers. Doklady Akademiia Nauk SSSR, 30:301-305, 1941. ISSN 13645021. doi: 10.1098/rspa.1991.0075. Accessed Mar. 29, 2023, URL: https://www.ams.jhu.edu/~eyink/Turbulence/classics/Kolmogorov41a.pdf.

Sorbjan, Zbigniew. Large-Eddy Simulations of the Baroclinic Mixed Layer. Boundary-Layer Meteorology, 112:57-80, 2004. ISSN 00068314. doi: 10.1023/B:BOUN.0000020161.99887.b3.

Stull, Roland B. An Introduction to Boundary Layer Meteorology. Atmospheric Sciences Library. Springer, Kluwer Academic Publishers, Dordrecht, The Netherlands, 1988. ISBN 978-90-277-2769-5. doi: 10.1007/978-94-009-3027-8.

* cited by examiner

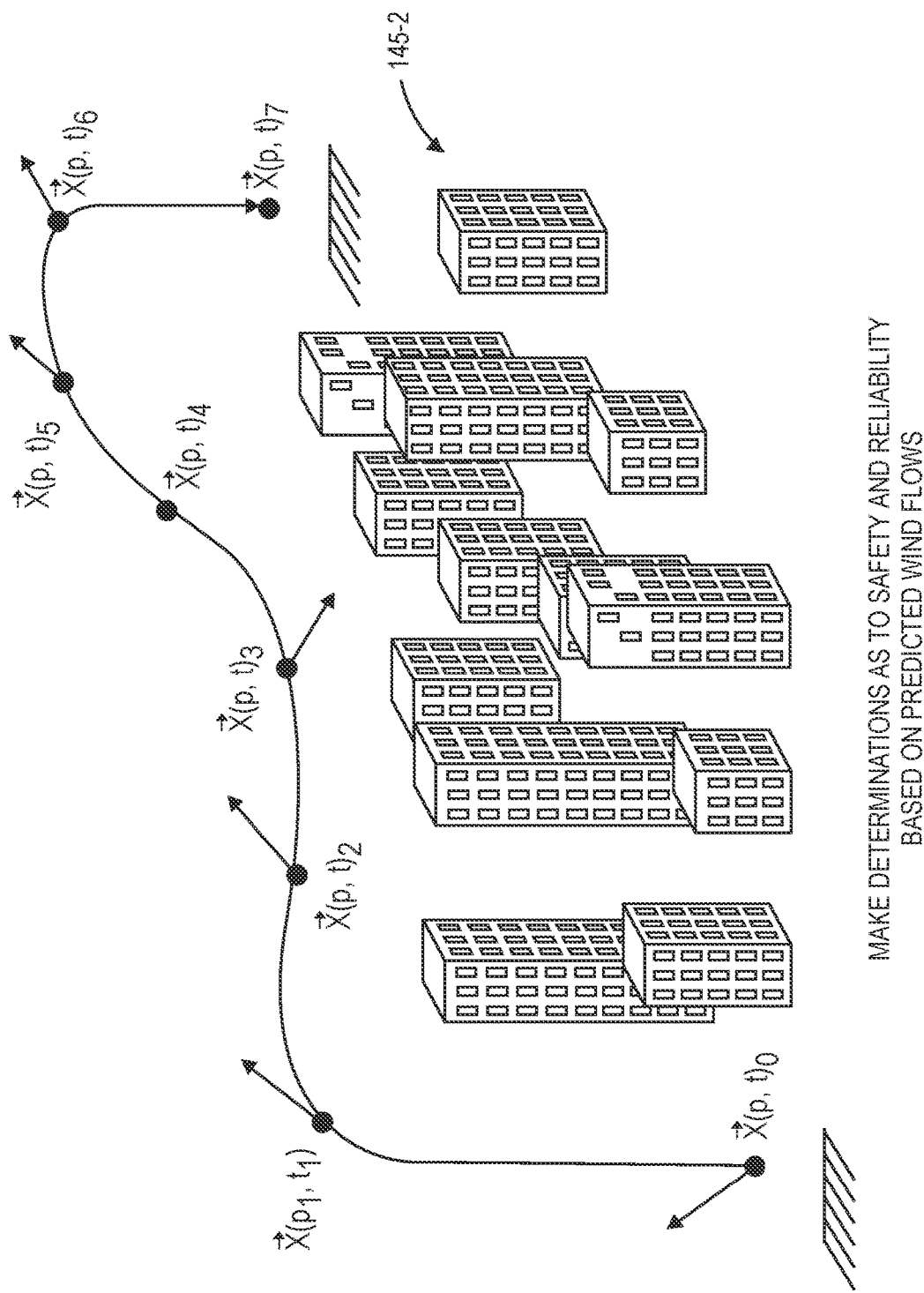

$\{X_T\} = \{U(p,t), v(p,t), w(p,t)\}$
WHERE $p_i = (x_i, y_i, z_i, h_i)$ $$\vec{X}(p,t) = \vec{M}(p) + \vec{R}(p,t)$$

TIME     AVERAGE     STOCHASTIC
SERIES     WIND     COMPONENT
          SPEED $$\Rightarrow \frac{\vec{X}(p,t) - \vec{M}(p)}{\sigma(p)} = \frac{\vec{R}(p,t)}{\sigma(p)}$$

CREATE RANDOM PROCESS GENERATOR FOR $\vec{R}(p,t)/\sigma(p)$

FIG. 5B

$$X(t) = \begin{cases} u(t) = \sigma_v \sum_{i=1}^{p} (a_i \tilde{u}_{t-i} + \epsilon_{u,t}) + M(u) \\ \\ v(t) = \sigma_v \sum_{i=1}^{p} (a_i \tilde{v}_{t-i} + \epsilon_{v,t}) + M(v) \\ \\ w(t) = \sigma_v \sum_{i=1}^{p} (a_i \tilde{w}_{t-i} + \epsilon_{w,t}) + M(w) \end{cases}$$

AUTOREGRESSIVE MODEL WITH COEFFICIENTS SELECTED BY
OUTPUT OF TRAINED COPULA

FIG. 5D

DATA-DRIVEN MODELING OF LOW-ALTITUDE TURBULENCE

BACKGROUND

Today, aerial vehicles are manufactured or assembled from a number of components that are specifically configured to operate together during flight. Typically, an aerial vehicle (e.g., an unmanned aerial vehicle, or "UAV," such as a drone) may be formed from lightweight metals, plastics or composites and outfitted with motors, rotors or other systems that are designed to permit the aerial vehicle to meet or exceed a number of operational constraints or requirements including speed, altitude or lift. For example, many aerial vehicles are constructed from molded plastic frames or bodies and outfitted with electric motors powered by onboard batteries or other power sources that permit the vehicles to conduct lifting or thrusting operations, while larger vehicles feature frames or bodies and skins formed from aluminum, titanium or carbon fiber, and are equipped with petroleum-powered engines capable of generating hundreds or thousands of pounds-force.

The urban boundary layer, or "UBL," is defined as a layer of the Earth's atmosphere extending from ground to approximately one kilometer above ground level. The urban boundary layer is characterized by important spatiotemporal variations in wind speed, temperature and humidity over a broad range of scales, and such variations may result in turbulence, which is apprehended as air motion characterized by chaotic changes in pressure and flow velocity. Turbulence is in contrast with laminar flow, which occurs when a fluid flows in parallel layers having no disruptions between such layers.

The urban boundary layer is commonly defined to include a pair of layers, viz., an inertial sublayer, or "ISL," and a roughness sublayer, or "RSL." The inertial sublayer typically rises from about five times an average building height within an urban region to approximately two hundred meters above the surface. Within the inertial sublayer, turbulence is produced by mean wind shear at large scales, and kinetic energy is transferred inertially to smaller scales via an energy cascade process. The roughness sublayer typically resides below the inertial sublayer, and rises from the surface up to about five times the average building height within the urban region. Within the roughness sublayer, turbulence varies strongly in space, and depends on a local configuration of obstacles such as buildings and trees. Parametrizing turbulence within the roughness sublayer is more challenging than within the inertial sublayer. Collectively, turbulence within the inertial sublayer and the roughness sublayer may be referred to as "low-altitude" turbulence.

Aerial vehicles frequently encounter turbulence while in flight. For this reason, turbulence models are frequently used in drone simulations to assess the stability and operability of aerial vehicles during flight operations. Many existing turbulence models, such as the von Kármán wind turbulence model, or the Dryden wind turbulence model, treat components of wind velocities as spatially varying stochastic processes having prescribed power spectral densities, and are characterized by irrational, power spectral densities. However, existing turbulence models, such as the von Kármán wind turbulence model, the Dryden wind turbulence model, or others, are typically ineffective at or incapable of properly modeling turbulence within the roughness sublayer, as such models often do not correctly identify or represent correlations between velocity components, anisotropies of Reynold stress tensors, intermittencies (such as non-Gaussian behaviors), buoyancy effects or other effects due to temperature stratifications, non-equilibrium effects, or variations in mean wind shears.

BRIEF DESCRIPTION OF THE DRAWINGS

FIGS. 1A through 1E are views of aspects of one system for modeling low-altitude turbulence in accordance with implementations of the present disclosure.

FIGS. 5A through 5D are views of aspects of one system for modeling low-altitude turbulence in accordance with implementations of the present disclosure.

DETAILED DESCRIPTION

As is set forth in greater detail below, the present disclosure is directed to systems and methods for modeling low-altitude turbulence. More specifically, the systems and methods of the present disclosure are directed to using computational fluid dynamics to model wind flow conditions, including low-altitude turbulence, e.g., turbulence that is present within or above urban environments, and make operational decisions based on the modeled wind flow conditions. The systems and methods of the present disclosure include models for low-altitude turbulence that are able to capture correlations between temperature, pressure, humidity and local surface geometries, among other factors. Such correlations are critical to making a sound and reliable assessment of vehicle performance in urban and rural environments.

The models of the present disclosure may be generated from or trained by time series of data obtained from any source. In some implementations, the time series may be obtained based on computational fluid dynamics (or "CFD") data, which may be determined from modeling synthetic environments that act as surrogates for actual environments, and may include synthetic virtual objects of any number, size or shape that are arranged in an array or otherwise located in discrete locations or positions. Alternatively, or additionally, the time series may be derived from actual, real-world conditions, such as by capturing data using one or more anemometers or other wind sensors, which may be provided in one or more fixed locations or carried aboard one or more aerial vehicles in flight.

Figure 1A:
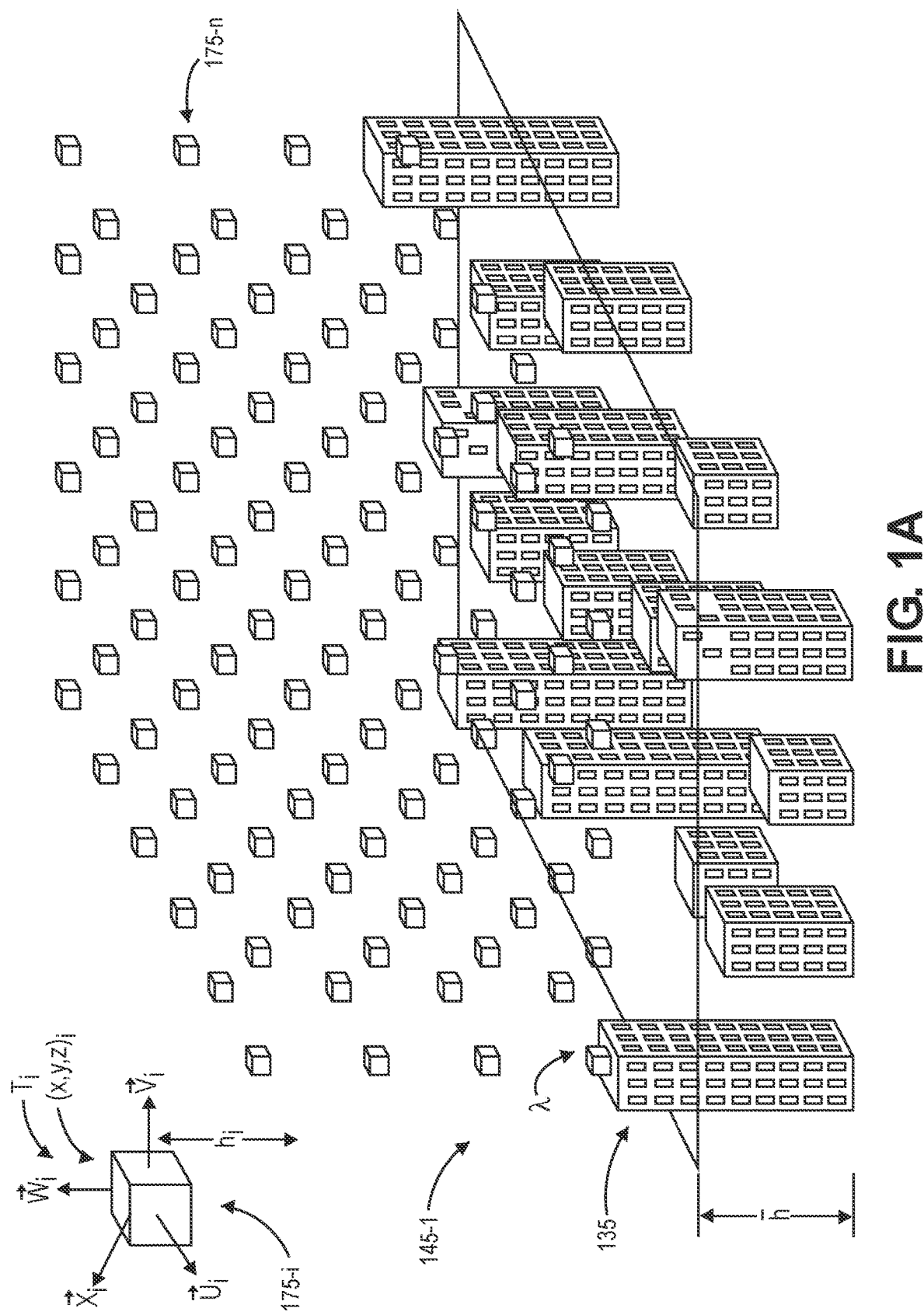

Referring to FIGS. 1A through 1E, views of aspects of one system for modeling low-altitude turbulence in accordance with implementations of the present disclosure are shown. As is shown in FIG. 1A, an environment 145-1 includes a plurality of surface features, which may be natural or artificial in nature. For example, the surface features within the environment 145-1 may include any buildings, structures or other artificial features, such as agricultural buildings (e.g., barns, farmhouses, sheds, silos, or others), commercial buildings (e.g., automotive repair shops, cafes, car washes, convention centers, drugstores, eateries, gas stations, hotels, markets, offices, pharmacies, restaurants, shops, sports clubs, or others), educational buildings (e.g., colleges, dormitories, libraries, museums, schools, theaters or others), government buildings (e.g., city or town halls, courthouses, embassies, fire stations, police stations, post offices, or others), industrial buildings (e.g., factories, foundries, mills, power plants, warehouses or water towers), medical buildings (e.g., hospitals, nursing homes, or others), public forums (e.g., amusement parks, arenas, stadiums, theaters, or others), residential homes or other dwellings (e.g., single-family homes, apartment buildings, condominiums, dormitories, townhouses, or others), transportation centers or facilities (e.g., airports, bus stations, parking garages, terminals, train stations, or others), or any other structures.

The surface features within the environment 145-1 may also include any type or form of natural features, such as landforms (e.g., canyons, hills, mountains, valleys, or others), plant life (e.g., shrubs, trees, or any others), or other natural features.

As is shown in FIG. 1A, data regarding wind flows and other conditions may be determined at various times and at a plurality of locations 175-$n$ within or above the environment 145-1. For example, as is shown in FIG. 1A, for a representative location 175-$i$ of the plurality of locations 175-$n$, corresponding to a position (x, y, z); in three-dimensional space provided at an altitude $h_i$ above a ground surface, a wind flow $X_i$ having velocity components $u_i$, $v_i$, $w_i$ along three orthogonal axes, e.g., in forward, lateral (or side-to-side) and vertical (or up and down) directions, may be determined. In some implementations, the velocity components $u_i$, $v_i$, $w_i$ may represent wind flows along streamwise, spanwise and vertical directions. Corresponding positions, velocities and altitudes of each of the plurality of locations 175-$n$ may likewise be determined and stored in one or more data stores. As is further shown in FIG. 1A, additional information or data regarding the environment 145-1, including but not limited to temperatures $T_i$ at the locations 175-$i$, an average height $\bar{h}$ and a density $\lambda$ of surface features 135 within the environment 145-1, or any other information or data regarding the environment 145-1, may also be determined.

In some implementations, wind flows and other conditions within or above the environment 145-1 may include actual velocities (e.g., speeds of wind flows and directions) that were captured using one or more anemometers or other wind sensors provided in fixed locations throughout the environment 145-1 or aboard one or more aerial vehicles operating in the environment 145-1. Information or data regarding velocities may be stored in association with locations (e.g., positions and/or heights) of fixed sensors that captured the information or data, or altitudes and positions of aerial vehicles that captured the information or data, in one or more physical locations, or in one or more alternate or virtual locations, such as a "cloud"-based environment. Moreover, the wind flows and other conditions may be determined across any portions of an atmospheric boundary layer, either uniformly along a column, or according to multiple different techniques. For example, in some implementations, the plurality of locations 175-$n$ may be located within a surface layer of the environment 145-1, such as an urban boundary layer having a pair of layers, viz., an inertial sublayer, or "ISL," and a roughness sublayer, or "RSL." The inertial sublayer may typically rise from about five times an average height of buildings or other surface features within the environment 145-1 to a peak altitude of approximately two hundred meters above a ground surface within the environment 145-1. Within an inertial sublayer, turbulence is commonly produced by mean wind shear at large scales, and kinetic energy is transferred inertially to smaller scales via an energy cascade process. The roughness sublayer may typically reside below the inertial sublayer, and rises from the surface up to about five times the average height within the environment 145-1. Within a roughness sublayer, turbulence varies strongly in space, and depends on a local configuration of obstacles such as the surface features of the environment 145-1. Collectively, turbulence within an urban boundary layer having an inertial sublayer and a roughness sublayer may be referred to as "low-altitude" turbulence.

Alternatively, wind flows and other conditions at the locations 175-$n$ may have been synthetically generated, e.g., by computational fluid dynamics simulations of wind flow through control volumes of computational domains generated for a surrogate environment having one or more attributes in common with or similar to attributes of the environment 145-1. In some implementations, the wind flows at the locations 175-$n$ may be constructed by solving filtered Navier-Stokes equations in rotation form, coupled with a temperature conservation equation. Alternatively, the time series of wind flows may be constructed in any other manner. For example, in some implementations, low-altitude turbulence within the environment 145-1 may be modeled using computational fluid dynamics and a surrogate environment generated for the environment 145-1 including a synthetic surface and a plurality of cuboids (or other virtual objects). The synthetic surface may be any planar or substantially planar surface of any relative shape or size, e.g., a rectangular shape, or a substantially rectangular shape, or any other shape defined by any number of straight or curvilinear sides. The cuboids may be six-faced substantially rectangular virtual objects having any relative dimensions with respect to the synthetic surface 142. Alternatively, a synthetic environment may include any virtual objects having any relative dimensions, shapes or sizes, or numbers of faces, e.g., virtual objects other than cuboids.

Additionally, information or other data regarding the environment 145-1 or the surface features therein may be identified or determined and stored in association with the wind flows at the plurality of locations 175-$n$. Such information or data may include, but need not be limited to, an average height of surface features, a density of the surface features, or any other information or data regarding the environment 145-1 or the surface features therein. The average height, the density, any other information or data regarding the environment 145-1 may be determined from any source, such as any number of information services or other resources. In some implementations, the information or data regarding the environment 145-1 may be determined based on any number of images or other data captured within, around or above the environment 145-1.

Figure 1B:
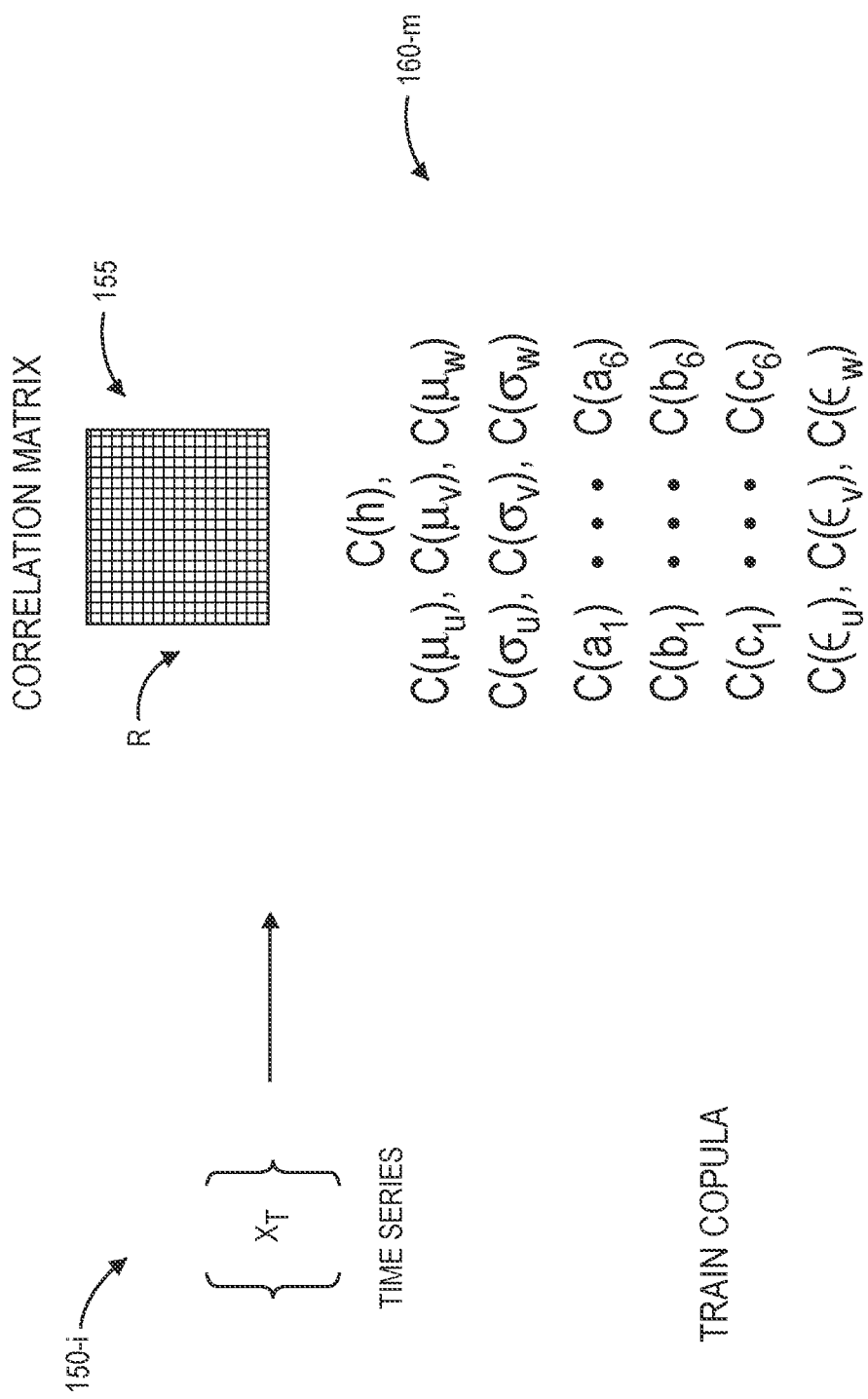

As is shown in FIG. 1B, a time series 150-$i$ of the wind flows at the locations 175-$n$ may be used to train a copula, which may be used to construct a random process model. For example, the time series 150-$i$ may include velocities at each of a plurality of positions p, and at each of a plurality of times t within a period of time T, or any other information or data, e.g., temperatures, average heights of surface features, densities of surface features. For each of the positions p, the wind flows represented in the time series 150-$i$ may be unpacked to components along orthogonal axes, e.g., in forward, lateral (or side-to-side) and vertical (or up and down) directions, such as a u-axis, a v-axis and a w-axis, and normalized using their respective means and standard deviations. For example, differences may be determined between velocities along each of the axes and means of velocities along such axes, and dividing the differences by standard deviations of velocities along such axes.

Subsequently, a time-invariant autoregressive process may be fit to the normalized time series. The autoregressive process may have an order p, such that a next value of the time series may be determined based on a product of a state transition matrix and a current value of the time series, and a sum of random, uncorrelated white noise. In some implementations, the autoregressive process may be converted to a zero-pole-gain representation to determine whether the random process is or will be stable. Subsequently, a copula (e.g., a Gaussian copula, or any other type or form of copula or other multivariate cumulative distribution function) may be fit to tuples of data including not only the altitudes but also coefficients of the autoregressive process and means and standard deviations of the velocities at each of the altitudes. The copula may be configured to receive marginal cumulative distribution functions from information or data regarding the time series 150-$i$, and correlations between the information or data, to approximate a cumulative distribution of all of the variables of the time series 150-$i$ together.

The copula may be determined by a correlation matrix 155, or R, as well as a plurality of marginal cumulative distribution functions 160-$m$, or a cumulative distribution function for altitudes C(h), cumulative distribution functions for means of the wind flows $C(\mu_u)$, $C(\mu_v)$, $C(\mu_w)$, cumulative distribution functions for standard deviations of the wind flows $C(\sigma_u)$, $C(\sigma_v)$, $C(\sigma_w)$, cumulative distribution functions for coefficients along the u-axis $C(\alpha_1)$, $C(\alpha_2)$, $C(\alpha_3)$, $C(\alpha_4)$, $C(\alpha_5)$, $C(\alpha_6)$, cumulative distribution functions for coefficients along the v-axis $C(b_1)$, $C(b_2)$, $C(b_3)$, $C(b_4)$, $C(b_5)$, $C(b_6)$, cumulative distribution functions for coefficients along the w-axis $C(c_1)$, $C(c_2)$, $C(c_3)$, $C(c_4)$, $C(c_5)$, $C(c_6)$, and cumulative distribution functions for standard deviations of white noise $C(\varepsilon_u)$, $C(\varepsilon_v)$, $C(\varepsilon_w)$ along each of the u-axis, the v-axis and the w-axis. For example, in some implementations, the copula determined by the correlation matrix 155, or R, may be a Gaussian copula that defines a dependence structure between variables of the marginal distribution functions 160-$m$, e.g., according to Sklar's theorem.

Figure 1C:
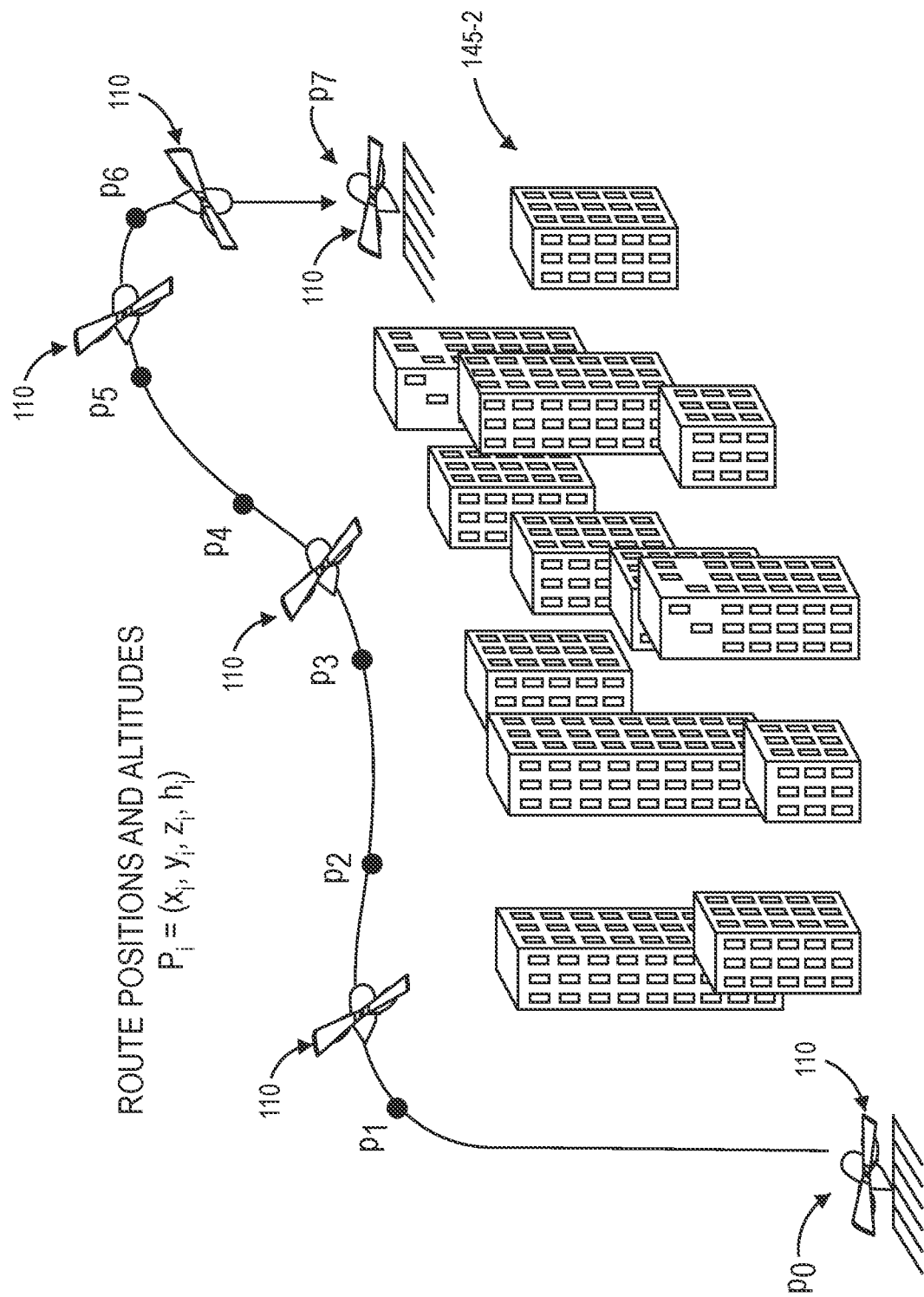

Subsequently, as is shown in FIG. 1C, where a mission for an aerial vehicle 110 is identified, and a route for the aerial vehicle 110 from an origin to a destination within or over an environment 145-2 is determined, a set of positions and altitudes $p_0$, $p_1$, $p_2$, $p_3$, $p_4$, $p_5$, $p_6$, $p_7$ at which the aerial vehicle 110 is expected to travel in performing the mission may be determined based on the route, where each of the positions $p_i$ includes coordinates or other representations of a position in three-dimensional space, or $x_i$, $y_i$, $z_i$, as well as an altitudes or heights above a ground surface within the environment 145-2, or $h_i$. In some implementations, the environment 145-2 may be the same environment from which the data regarding wind flows and other conditions were determined for training the copula, e.g., the environment 145-1. Alternatively, the environment 145-2 may be a different environment that may have any number of attributes or features in common with the environment from which the data regarding wind flows and other conditions were determined for training the copula, e.g., the environment 145-1.

Figure 1D:
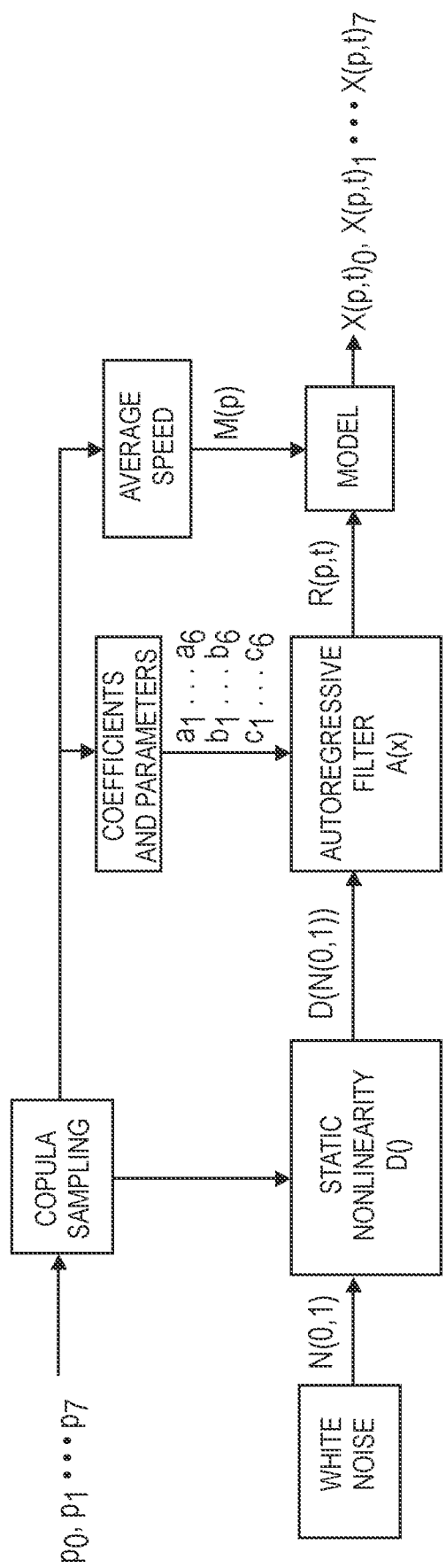

As is shown in FIG. 1D, the set of positions $p_0$, $p_1$, $p_2$, $p_3$, $p_4$, $p_5$, $p_6$, $p_7$ may be used to generate predictions of wind flows during the performance of the mission by the aerial vehicle 110. For example, a set of white noise N(0,1), or random signals having a constant power spectral density that bear no relation to one another but have a zero mean, may be identified for each of the positions $p_0$, $p_1$, $p_2$, $p_3$, $p_4$, $p_5$, $p_6$, $p_7$ of the set. Additionally, the positions $p_0$, $p_1$, $p_2$, $p_3$, $p_4$, $p_5$, $p_6$, $p_7$ may be provided to a lookup table from which a static nonlinearity D( ) and a set of coefficients $\alpha_1$, $\alpha_2$, $\alpha_3$, $\alpha_4$, $\alpha_5$, $\alpha_6$ corresponding to a u-axis, $b_1$, $b_2$, $b_3$, $b_4$, $b_5$, $b_6$ corresponding to a v-axis, and $c_1$, $c_2$, $c_3$, $c_4$, $c_5$, $c_6$ corresponding to a w-axis for an autoregressive filter A(x) are identified.

A random component R(p, t) representing gusts of wind or other uncertainties may be identified for each of the positions $p_0$, $p_1$, $p_2$, $p_3$, $p_4$, $p_5$, $p_6$, $p_7$ by providing the set of white noise N(0,1) to the static nonlinearity D( ) and then as inputs to the autoregressive filter A(x). Likewise, a copula may be sampled based on the positions $p_0$, $p_1$, $p_2$, $p_3$, $p_4$, $p_5$, $p_6$, $p_7$, and the coefficients or any other parameters for deriving the autoregressive filter A(x) are identified based on the copula.

An average speed of winds at each of the positions $p_0$, $p_1$, $p_2$, $p_3$, $p_4$, $p_5$, $p_6$, $p_7$, Or M(p), may be determined in any manner, e.g., by resort to a lookup table for such positions. Wind flows $X(p,t)_0$, $X(p,t)_1$, $X(p,t)_2$, $X(p,t)_3$, $X(p,t)_4$, $X(p,t)_5$, $X(p,t)_6$, $X(p, t)_7$ at each of the positions $p_0$, $p_1$, $p_2$, $p_3$, $p_4$, $p_5$, $p_6$, $p_7$ may thus be determined by sums of the components R(p, t) representing gusts of wind determined from outputs from the autoregressive filter A(x) and the average speeds of winds M(p) at such altitudes.

In some implementations, wind flows may be predicted at a plurality of points within an environment, independent of any mission that is to be performed within the environment by any aerial vehicle. When a mission requiring travel through the environment is identified, and waypoints of one or more routes to be traveled along by aerial vehicles are determined, wind conditions at such waypoints may be determined, e.g., by interpolation, based on the predicted wind flows.

As is shown in FIG. 1E, a determination as to the safety and reliability of the mission may be made based on the set of wind flows $X(p, t)_0$, $X(p, t)_1$, $X(p, t)_2$, $X(p, t)_3$, $X(p, t)_4$, $X(p, t)_5$, $X(p, t)_6$, $X(p, t)_7$ for the aerial vehicle 110 determined as is shown in FIG. 1D. For example, where each of the wind flows $X(p, t)_0$, $X(p, t)_1$, $X(p, t)_2$, $X(p, t)_3$, $X(p, t)_4$, $X(p, t)_5$, $X(p, t)_6$, $X(p, t)_7$ indicates that the aerial vehicle 110 may safely and reliably perform the mission, the aerial vehicle 110 may be permitted to proceed as planned. Where one or more of the wind flows $X(p, t)_0$, $X(p,t)_1$, $X(p,t)_2$, $X(p,t)_3$, $X(p,t)_4$, $X(p,t)_5$, $X(p,t)_6$, $X(p, t)_7$ indicates that the aerial vehicle 110 may be at a risk of loss of control, or is at risk of collision with one or more objects if the mission was attempted, the mission may be postponed, modified or aborted in response to such risks. Alternatively, the mission may be performed subject to one or more limitations or restrictions on speed, altitude or other parameters, which may be determined or selected based on the values of the wind flows or on any other basis.

Prior to engaging in flight operations of one or more unmanned aerial vehicles, assessments regarding likelihoods of success, safety, and reliability for the operations must be made. In some instances, such assessments may be conducted via one or more computer simulations of flight in operational environments under a range of turbulent wind and weather conditions. However, many classical stochastic turbulence models fail to accurately predict low-altitude turbulence within cluttered environments, such as hilly terrains or urban landscapes. Many random processes are unable to capture essential aspects of low-altitude turbulence such as time-correlations between velocity components, non-Gaussian turbulence behavior or extreme wind events, buoyancy effects due to ambient temperature stratification, or sudden wind accelerations or decelerations due to submesoscale perturbations. In particular, at low altitudes, flow features may be strongly modulated by details of underlying surface geometries (e.g., buildings, trees, terrain or other surface features), and existing turbulence models are generally unable to account for such effects.

In some implementations, the systems and methods of the present disclosure rely upon non-linear stochastic models that may capture various properties of low-altitude turbulence. Such models may generate probability distributions for all parameters used within the models, e.g., wind speeds, temperatures, turbulence intensities, velocity covariances, or others, as functions of local surface geometries and weather conditions. The models enable location-dependent predictions of success, safety, and reliability, as well as probabilities such as a probability that control will be lost, a probability that an urgent landing will be required, or a probability that a mission, e.g., a delivery of an item to a destination, may be delayed. In some implementations, models may include parameters that may be trained based on computational fluid dynamics (or "CFD") data. In some other implementations, the parameters may be trained based on outputs of measurement devices such as sonic anemometers, light detection and ranging (or "LIDAR") systems, vehicle-based turbulence measurement systems, or others.

In some implementations, after a model has been trained, the model may be incrementally improved, e.g., by further training coefficients of an autoregressive process to incorporate additional information or data, as such information or data becomes available. For example, models of the present disclosure may capture a joint probability distribution of all parameters so that correlations between atmospheric variables such as temperature, pressure, or humidity and local geometry variables such as surface roughness or mean building height may be tied to parameters in the joint probability distribution and with each other.

The systems and methods of the present disclosure may be utilized to model wind flows within surface layers of environments, such as an urban boundary layer, which may include an inertial sublayer, or "ISL," that typically rises from about five times an average height of surface features within an environment to a peak altitude of approximately two hundred meters above a ground surface. Within the inertial sublayer, turbulence is commonly produced by mean wind shear at large scales, and kinetic energy is transferred inertially to smaller scales via an energy cascade process. The urban boundary layer may also include a roughness sublayer, or "RSL," that typically resides below an inertial sublayer, and rises from the surface up to about five times the average height of surface features within an environment. Within the roughness sublayer, turbulence varies strongly in space, and depends on a local configuration of obstacles such as the surface features. Parametrizing turbulence within a roughness sublayer is more challenging than within an inertial sublayer. Collectively, turbulence within an inertial sublayer and the roughness sublayer may be referred to as "low-altitude" turbulence.

Figure 2:
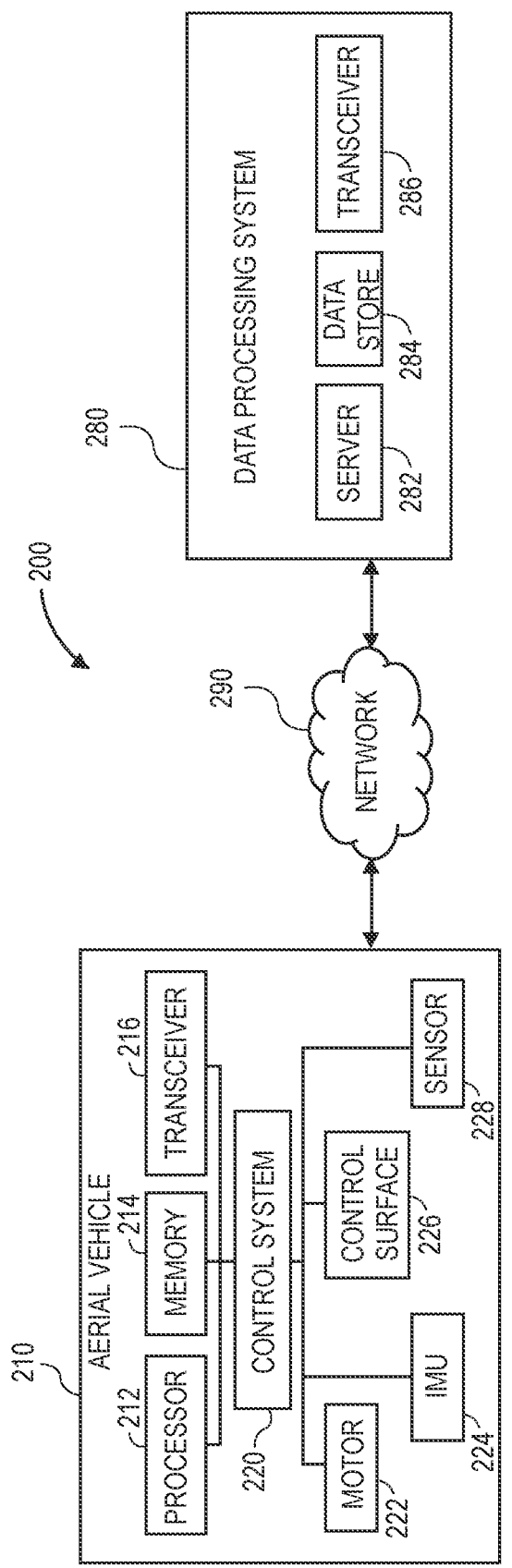
FIG. 2 is a block diagram of one system for modeling low-altitude turbulence in accordance with implementations of the present disclosure.

Referring to FIG. 2, block diagrams of components of one system 200 for modeling low-altitude turbulence in accordance with implementations of the present disclosure is shown. The system 200 of FIG. 2 includes an aerial vehicle 210 and a data processing system 280 connected to one another over a network 290. Except where otherwise noted, reference numerals preceded by the number "2" shown in the block diagrams of FIG. 2 indicate components or features that are similar to components or features having reference numerals preceded by the number "1" shown in FIGS. 1A through 1E.

The aerial vehicle 210 includes a processor 212, a memory 214 and a transceiver 216. The aerial vehicle 210 further includes a control system 220, one or more propulsion motors 222, an inertial measurement unit (or "IMU") 224, one or more control surfaces 226 and one or more sensors 228.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques associated with one or more applications, purposes or functions of the aerial vehicle 210, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the motors 222, the inertial measurement unit 224, the control surfaces 226 or the sensors 228.

The processor 212 may also control the operation of one or more control systems or modules, such as the control system 220, for generating instructions for conducting operations of one or more of the propulsion motors 222, the inertial measurement unit 224, or the control surfaces 226, or for interpreting information or data captured by the sensors 228. Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some implementations, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some implementations, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some implementations, the transceiver 216 may be configured to coordinate I/O traffic between the processor 212 and one or more onboard or external computer devices or components, e.g., the motors 222, the inertial measurement unit 224, the control surfaces 226 or the sensors 228, or any other devices or components (not shown). The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the Universal Serial Bus (USB) standard. In some other implementations, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the motors 222, the inertial measurement unit 224, the control surfaces 226 or the sensors 228, or other components, such as to cause one or more of the motors 222 to rotate propellers at desired speeds or to cause such propellers to be aligned in selected positions or orientations. The control system 220 may further control any other aspects of the aerial vehicle 210, including but not limited to the operation of one or more aspects of the control surfaces 226, which may include wings, rudders, ailerons, elevators, flaps, brakes, slats or other features within desired ranges, or the enactment with or release of one or more items by one or more engagement systems (not shown). The control system 220 may also interpret data captured or signals generated by the inertial measurement unit 224, or the sensors 228. In some implementations, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some implementations, one or more of the motors 222 may be a brushless DC multi-phase motor such as an outrunner brushless motor or an inrunner brushless motor.

The aerial vehicle 210 may include any number of motors 222 of any kind. For example, one or more of the motors 222 may be aligned or configured to provide forces of lift to the aerial vehicle 210, exclusively, while one or more of the motors 222 may be aligned or configured to provide forces of thrust to the aerial vehicle 210, exclusively. Alternatively, one or more of the motors 222 may be aligned or configured to provide forces of lift and forces of thrust to the aerial vehicle 210, as needed. For example, the motors 222 may be fixed in their orientation on the aerial vehicle 210, or configured to vary their respective orientations, e.g., a tilt-rotor aircraft. Moreover, the motors 222 may be aligned or configured to operate with different capacities or ratings, or at different speeds, or coupled to propellers having different sizes and shapes. For example, in some implementations, one or more of the motors 222 may be an electric motor, e.g., a brushless DC multi-phase motor, and one or more of the motors 222 may be a gasoline-powered motor.

Each of the motors 222 may be coupled to one or more propellers (or rotors or rotatable systems) having a plurality of shaped blades joined to a hub or boss. For example, each of such propellers may be rotatably mounted to a mast or shaft associated with a respective one of the motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some implementations, one or more propellers may be configured to rotate about a vertical axis, and to provide forces of lift in a vertical direction (e.g., upward) accordingly. In some other implementations, one or more of the propellers may be configured to rotate about a horizontal axis, and to provide forces of thrust in a horizontal direction (e.g., forward) accordingly. In still other implementations, one or more of the propellers may be configured to rotate about axes that are neither horizontal nor vertical, and to provide forces of lift and/or thrust in directions corresponding to such axes accordingly.

The inertial measurement unit 224 may be any type or form of onboard device for sensing changes in linear or rotational motion of the aerial vehicle 210. In some implementations, the inertial measurement unit 224 may include one or more gyroscopes, one or more accelerometers, one or more compasses (or other magnetometer), and a Global Positioning System ("GPS") transceiver. In some implementations, the inertial measurement unit 224 may be installed onboard the aerial vehicle 210, such as at or near a center of gravity of the aerial vehicle 210, or in another position aboard the aerial vehicle 210, and intended for use during in-flight operations, e.g., in association with an inertial navigation system. In some other implementations, however, the inertial measurement unit 224 may be strapped or mounted to an object suspended within the aerial vehicle 210.

Gyroscopes of the inertial measurement unit 224 may be any mechanical or electrical device, component, system, or instrument for determining an orientation, e.g., the orientation of the aerial vehicle 210. For example, the gyroscopes may be traditional mechanical gyroscopes, each having at least a pair of gimbals and a flywheel or rotor. Alternatively, the gyroscopes may be electrical components such as dynamically tuned gyroscopes, fiber optic gyroscopes, hemispherical resonator gyroscopes, London moment gyroscopes, microelectromechanical sensor gyroscopes, ring laser gyroscopes, or vibrating structure gyroscopes, or any other type or form of electrical component for determining an orientation of the aerial vehicle 210. In some implementations, the gyroscopes may generate angular rate data in any direction or along or about any axis.

Accelerometers of the inertial measurement unit 224 may be any mechanical or electrical devices, components, systems, or instruments for sensing or measuring accelerations, including but not limited to devices having one or more potentiometers, linear variable differential transformers, variable reluctance devices or piezoelectric components. For example, in some implementations, the accelerometers may be configured to capture acceleration data in any direction or along or about any axis, e.g., a triaxial accelerometer. The gyroscopes and/or the accelerometers of the inertial measurement unit 224 may be configured to generate angular rate data or acceleration data, respectively, at any rate or frequency, such as at frequencies ranging from zero to five hundred Hertz (0-500 Hz) or at frequencies greater than five hundred hertz (500 Hz).

Compasses of the inertial measurement unit 224 may be any devices, components, systems, or instruments adapted to determine one or more directions with respect to a frame of reference that is fixed with respect to the surface of the Earth (e.g., a pole thereof). For example, the compasses may include one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). GPS transceivers may be any devices, components, systems, or instruments adapted to receive signals (e.g., trilateration data or information) relating to a position of the inertial measurement unit 224 from one or more GPS satellites of a GPS network (not shown), or for reporting the position of the inertial measurement unit 224 determined based on such signals. Alternatively, the GPS transceivers may be any devices or components for determining geolocations (e.g., geospatially-referenced points that precisely define an exact location in space with one or more geocodes), such as a set of geographic coordinates, e.g., a latitude and a longitude, and, optionally, an elevation that may be ascertained from signals (e.g., trilateration data or information) or geographic information system (or "GIS") data. Geolocations of the GPS transceivers or the inertial measurement unit 224 may be associated with the aerial vehicle 210, where appropriate.

In some implementations, the inertial measurement unit 224 may further include any number of computer components, e.g., one or more processors, memory components and/or transceivers (not shown), or any other components for aiding in the determination of accelerations, velocities, positions and/or orientations.

The control surfaces 226 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 226 may include, but are not limited to, wings, rudders, ailerons, elevators, flaps, brakes or slats, or other features. In some implementations, each of the control surfaces 226 may include a motor, such as an electrical, mechanical and/or hydraulic or other component or actuator for rotating, translating or otherwise repositioning or reorienting a respective one of the control surfaces 226 during operation of the aerial vehicle 210, under the control of the one or more processors 212 or the control system 220. In some implementations, each of the control surfaces 226 may include a directional sensor, such as any type of sensor or other component that is embedded into one or more aspects of one of the control surfaces 226 (e.g., a leading edge, a trailing edge, a tip or one or more other faces or aspects of such surfaces 226) and configured to gather information or data with respect to an alignment or orientation thereof. For example, one of the control surfaces 226 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction.

The sensors 228 may be any devices, systems or components that are configured to capture data regarding the aerial vehicle 210, or its surroundings, as the aerial vehicle 210 is engaged in operations or testing, or at any other time. In some implementations, the sensors 228 may include any number of sensors, e.g., a suite of such sensors, of any type or form. For example, the sensors 228 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the aerial vehicle 210, for any purpose. For example, the sensors 228 may be configured to capture or detect reflected light if the reflected light is within a field of view of the sensors 228, which is defined as a function of a distance between an imaging sensor and a lens within the sensors 228, viz., a focal length, as well as a position of the sensors 228 and an angular orientation of the lens. Accordingly, where an object appears within a depth of field, or a distance within the field of view where the clarity and focus is sufficiently sharp, the sensors 228 may capture light that is reflected off objects of any kind to a sufficiently high degree of resolution using one or more sensors thereof, and store information regarding the reflected light in one or more data files.

The sensors 228 may also include manual or automatic features for modifying a field of view or orientation. For example, the sensors 228 may be a digital camera configured in a fixed position, or with a fixed focal length (e.g., fixed-focus lenses) or angular orientation. Alternatively, the sensors 228 may include one or more actuated or motorized features for adjusting a position of the sensors 228, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensors 228, or a change in one or more of the angles defining the angular orientation of the sensors 228.

For example, the sensors 228 may be an imaging device that is hard-mounted to the aerial vehicle 210 in a fixed configuration or angle with respect to one, two or three axes. Alternatively, however, the sensors 228 may be provided with one or more motors and/or controllers for manually or automatically operating one or more of the components, or for reorienting the axis or direction of the sensors 228, i.e., by panning or tilting the sensors 228. Panning the sensors 228 may cause a rotation within a horizontal plane or about a vertical axis (e.g., a yaw), while tilting the sensors 228 may cause a rotation within a vertical plane or about a horizontal axis (e.g., a pitch). Additionally, the sensors 228 may be rolled, or rotated about its axis of rotation, and within a plane that is perpendicular to the axis of rotation and substantially parallel to a field of view of the sensors 228.

Imaging data (e.g., still or moving images, as well as associated audio data or metadata) captured using the sensors 228 may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensors 228 may further be or include one or more sound sensors (e.g., microphones, piezoelectric sensors, vibration sensors or other transducers for detecting and recording acoustic energy from one or more directions), anemometers (e.g., instruments for determining wind speeds and/or wind pressures), inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

The sensors 228 may be further configured to capture, record and/or analyze information or data regarding the aerial vehicle 210, and to analyze such data or information by one or more means, e.g., by aggregating or summing such information or data to form one or more qualitative or quantitative metrics associated with the motion of the aerial vehicle 210. For example, a net vector indicative of any and all relevant movements of the aerial vehicle 210, including but not limited to physical accelerations, velocities, positions or orientations of the sensors 228, may be derived, and the net vector may include any other values associated with information or data captured by any of the sensors 228, e.g., images, sounds, or the like. Additionally, coefficients or scalars indicative of the relative movements of the aerial vehicle 210 may also be defined.

Although the aerial vehicle 210 shown in the block diagram of FIG. 2 includes a single box for a motor 222, a single box for an inertial measurement unit 224, a single box for a control surface 226, and a single box for a sensor 228, those of ordinary skill in the pertinent arts will recognize that any number or type of motors, inertial measurement units (or components thereof), control surfaces or sensors may be provided aboard the aerial vehicle 210 in accordance with the present disclosure. Alternatively, in some implementations, the aerial vehicle 210 may be a ground vehicle or any other object. The systems and methods of the present disclosure are not limited for use in connection with aerial vehicles.

As is shown in FIG. 2, the data processing system 280 includes one or more physical computer servers 282 having one or more data stores 284 and one or more transceivers 286 associated therewith, and may be provided for any specific or general purpose. For example, the data processing system 280 may be independently provided for the exclusive purpose of receiving, analyzing or storing information or data received from the aerial vehicle 210. Alternatively, the data processing system 280 of FIG. 2 may be provided in connection with one or more physical or virtual services configured to receive, analyze or store such information or data, as well as one or more other functions.

In some implementations, the data processing system 280 may be configured to perform, execute or solve any number of mathematical formulas, equations or relationships. For example, in some implementations, the data processing system 280 may be configured to execute one or more differential equations, e.g., partial differential equations, or solve for any relationships. In some implementations, the data processing system 280 may be configured to execute any number of simulations or modeling techniques, such as by simulating the presence or absence of any obstacles such as buildings within an outdoor environment, or modeling flow of air from any direction and at any velocity over or between such obstacles. For example, in some implementations, the data processing system 280 may be configured to construct surrogate environments (or synthetic environments) and select flow regimes or conditions subject to any number or set of rules, or on any other basis, and may simulate flow conditions according to one or more simulations, e.g., computational fluid dynamics simulations such as large-eddy simulations or others. The flow conditions may be simulated by solving for any calculations to predict wind flows at various locations within computational domains.

The servers 282 may be connected to or otherwise communicate with the data stores 284 and the transceiver 286. The data stores 284 may store any type of information or data, including but not limited to information or data received from the aerial vehicle 210 or from any other source, for any purpose. The transceiver 286 may share any of the features, properties or attributes of the transceiver 216 described above, or may have one or more different features, properties or attributes. The servers 282 and/or the transceiver 286 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some implementations, the data processing system 280 may be provided in a physical location. In other such implementations, the data processing system 280 may be provided in one or more alternate or virtual locations, e.g., in a "cloud"-based environment. In still other implementations, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210 or the data processing system 280 may operate, include or be associated with any of a number of computing devices that are capable of communicating over the network 290. The protocols and components for providing communication between such devices are well known to those skilled in the art of computer communications and need not be described in more detail herein.

Data and/or computer-executable instructions, programs, firmware, software and the like described herein may be stored on a computer-readable medium that is within or accessible by computers or computer components such as the processor 212 or the server 282, or any other computers or control systems utilized by the aerial vehicle 210 or the data processing system 280, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
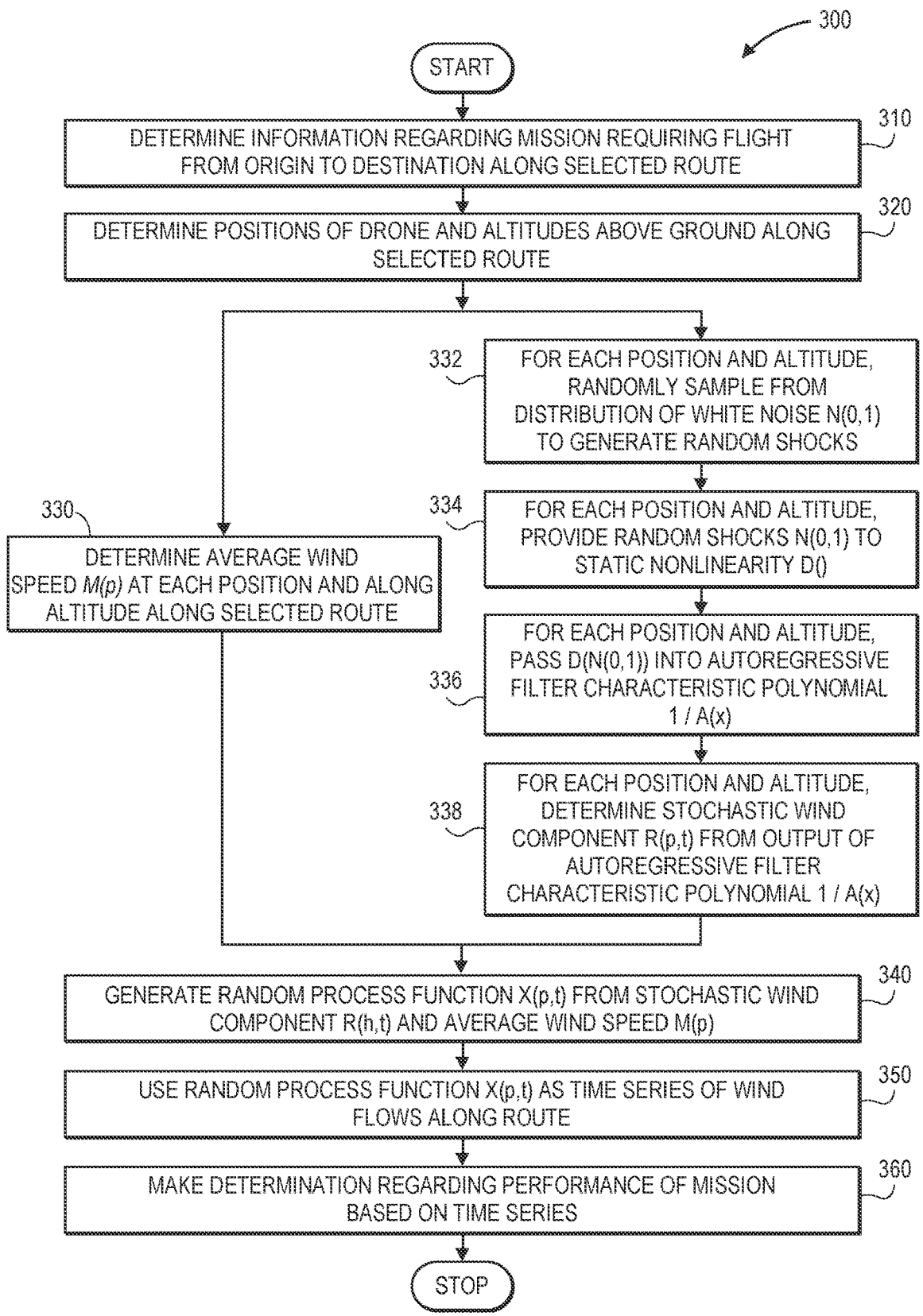
FIG. 3 is a flow chart of one process for modeling low-altitude turbulence in accordance with implementations of the present disclosure.

Referring to FIG. 3, a flow chart 300 of one process for modeling low-altitude turbulence in accordance with implementations of the present disclosure is shown.

At box 310, information regarding a mission requiring flight from an origin to a destination along a selected route is determined. For example, the mission may require an aerial vehicle to travel from the origin to the destination along a route defined by a plurality of waypoints, which may be represented as points in three-dimensional space, or in any other manner.

At box 320, a set of positions and altitudes along the selected route are determined. For example, positions defined by sets of coordinates in three-dimensional space through which an aerial vehicle is to travel along the route from the origin to the destination, and altitudes defined by distances above ground surfaces along the route may be identified.

At box 330, an average wind speed M(p) at each position and altitude along the selected route are determined. For example, the average wind speeds may be recorded or predicted average values along three orthogonal axes, e.g., in forward, lateral (or side-to-side) and vertical (or up and down) directions, such as a u-axis, a v-axis and a w-axis, respectively.

In parallel, at box 332, for each position and altitude, a normal distribution of white noise N(0,1) is selected to generate random shocks during flight along the route.

At box 334, for each position and altitude, the random shocks from the normal distribution of white noise N(0,1) are provided to a static nonlinearity, or D( ).

At box 336, for each position and altitude, the static nonlinearity D(N(0,1)) is passed into an autoregressive filter characteristic polynomial, or 1/A(x). The autoregressive filter characteristic polynomial may have been generated in any manner, such as based on outputs of a copula, as well as cumulative distribution functions representing the relationships between coefficients of the autoregressive filter characteristic polynomial and means or standard deviations of wind velocities with altitudes h above ground surfaces. The autoregressive filter characteristic polynomial may be derived from wind flows modeled from computational fluid dynamics (or "CFD") or, alternatively, from actual wind flows determined by anemometers or other sensors, or measured by aerial vehicles in flight within a vicinity of the route.

At box 338, for each position and altitude, a stochastic wind component R(p,t) is determined at a given time from an output of the autoregressive filter characteristic polynomial $1/A(x)$. The stochastic wind component $R(p,t)$ may be determined by sampling the copula at each position and altitude.

At box 340, a random process function $X(p,t)$ is generated from the stochastic wind component $R(p,t)$ and the average wind speed $M(p)$ for each position and altitude.

At box 350, the random process function $X(p,t)$ is used as a time series of wind flows along the route. For example, in some implementations, wind flows may be predicted in time at fixed locations along the route, e.g., for each of a plurality of points defining the route, or for a subset of such points. The predicted wind flows may represent wind velocities along or about orthogonal axes, e.g., in forward, lateral (or side-to-side) and vertical (or up and down) directions, such as a u-axis, a v-axis and a w-axis, respectively.

At box 360, a determination is made as to the performance of the mission based on the time series determined at box 350, and the process ends. For example, based on the time series determined from the random process function $X(p,t)$, a likelihood that the mission may be completed safely and reliably is determined. In some implementations, whether an aerial vehicle may be predicted to remain on or near the selected route, or to take off and land safely, may be predicted based on the time series. If it is determined that an aerial vehicle may safely and reliably complete the mission, a control system of the aerial vehicle is programmed based on the predicted wind flows, and the process ends. In some implementations, one or more control algorithms executed by the aerial vehicle may be trained using the selected wind flows. Once the control system is programmed, or the control algorithms are trained, the aerial vehicle may operate to complete the mission, e.g., by executing instructions for causing operations of propulsion motors, control surfaces or other features.

Figure 4:
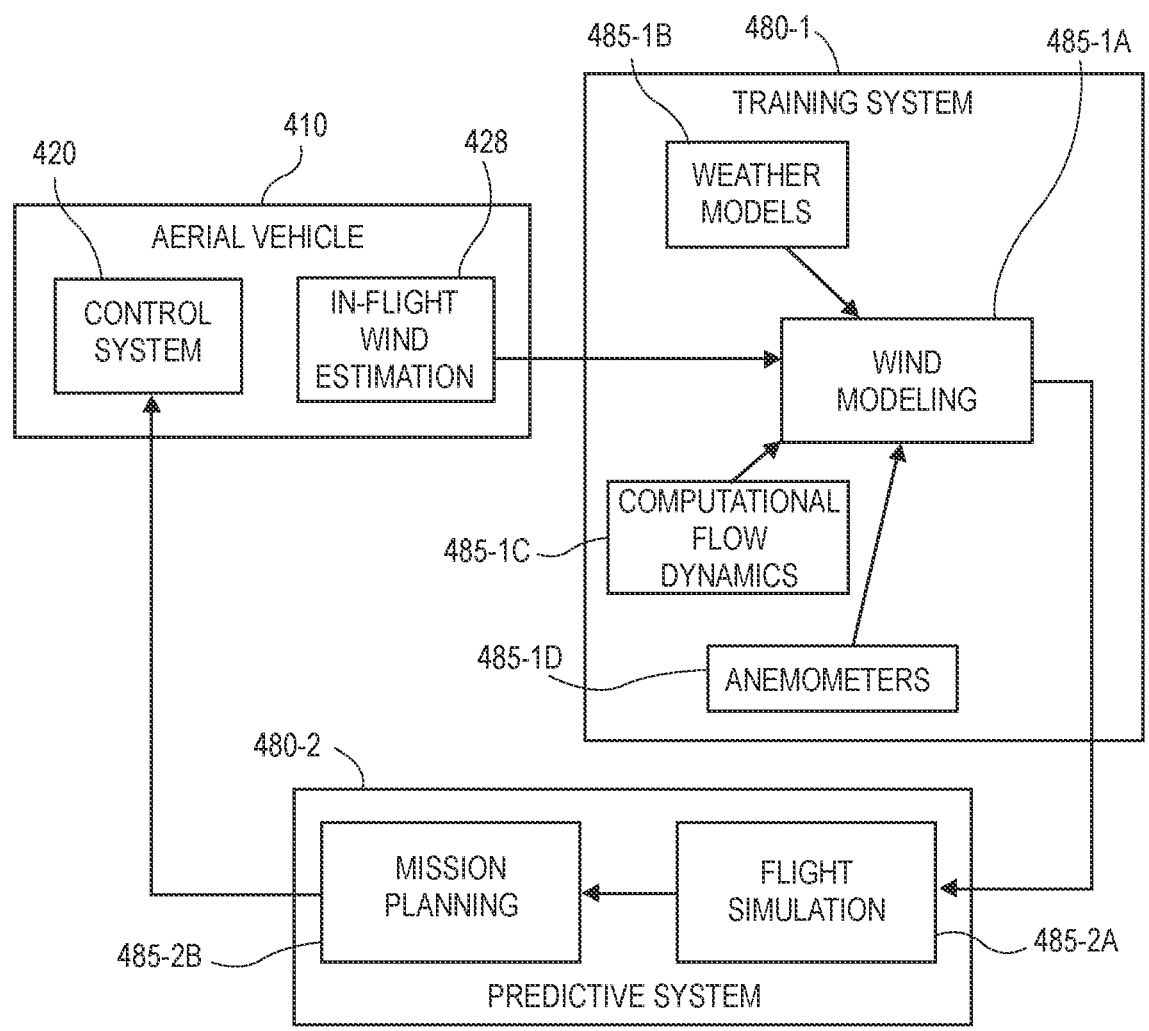
FIG. 4 is a view of aspects of one system for modeling low-altitude turbulence in accordance with implementations of the present disclosure.

Referring to FIG. 4, a view of aspects of one system for modeling low-altitude turbulence in accordance with implementations of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1E.

As is shown in FIG. 4, a training system 480-1 includes a wind modeling component 485-1A that is configured to generate predictions of wind flows based on data obtained from any number of sources. For example, the wind modeling component 485-1A may receive information or data regarding prevailing or predicted weather conditions in a given environment, e.g., from one or more weather models, as well as actual in-flight wind estimates 428 received from aerial vehicles 410 operating within the environment. The wind modeling component 485-1A may further receive information or data regarding predicted wind conditions within the environment in the form of outputs from one or more weather models 485-1B (e.g., predicted precipitation, temperatures, pressures or other conditions), or one or more computational fluid dynamics simulations 485-1C, as well as actual wind conditions within the environment from one or more anemometers 485-1D. Alternatively, the wind modeling component 480-1 may generate one or more predictions of wind flows or other conditions based on any other information or data (not shown).

The wind modeling component 485-1A may generate predictions of wind flows at various points within an environment, and provide such predictions to a predictive system 480-2, which may process the predictions using a flight simulation module 485-2A, e.g., to determine effects of the predicted wind flows on a mission to be performed within the environment. Data regarding effects of the predicted wind flows on one or more missions may be provided to a mission planning module 485-2B, which may select one or more waypoints or routes to be traveled along or through the environment during the performance of one or more missions. For example, predictions of wind enable determinations as to whether a mission may be performed, or under what conditions the mission may be performed, and whether services associated with the mission remain available to those who rely upon them, e.g., whether deliveries of items to customers within the environment may be performed during the predicted wind conditions.

Such waypoints or routes may be provided to a control systems 420 of one or more aerial vehicles 410, which may be configured to execute one or more instructions for causing the aerial vehicles 410 to travel at altitudes, on courses or at speeds within the environment during the performance of one or more missions. While traveling within the environment, the aerial vehicles 410 may return in-flight wind estimates 428 to the wind modeling system 485-1A, in order to generate or update predictions of wind within the environment.

The processes described above in connection with FIG. 4 may be performed or repeated for simulations of flight by multiple aerial vehicles within an environment, or based on flow conditions within the environment determined or predicted based on information or data captured by any number of such aerial vehicles.

Referring to FIGS. 5A through 5D, views of aspects of one system for modeling low-altitude turbulence in accordance with implementations of the present disclosure are shown. Except where otherwise noted, reference numerals preceded by the number "5" shown in FIGS. 5A through 5D indicate components or features that are similar to components or features having reference numerals preceded by the number "4" in shown in FIG. 4, by the number "2" shown in FIG. 2 or by the number "1" shown in FIGS. 1A through 1E.

Figure 5A:
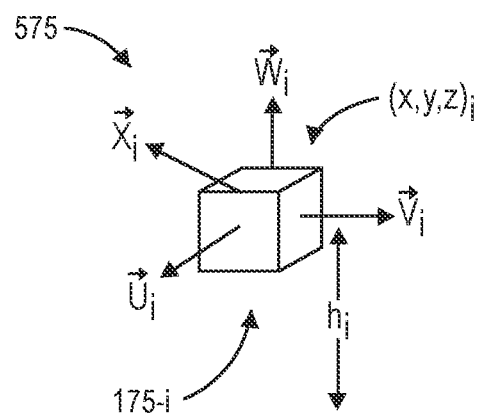

As is shown in FIG. 5A, a model for determining wind flows at any each of a plurality of positions 575 based on time series of wind flows along orthogonal axes in forward, lateral (or side-to-side) and vertical (or up and down) directions, e.g., a u-axis, a v-axis and a w-axis may be generated based on a time series $\{X_T\}$. For example, the time series $\{X_T\}$ may include information regarding a plurality of wind flows $X_i$ at the positions 575, each of which may be represented by an altitude $h_i$ and coordinates $(x, y, z)_i$, with the wind flows $X_i$ having components $u_i$, $v_i$, $w_i$ along the respective axes. The model may be utilized to derive solutions that, at any given position, resemble the time series $\{XT\}$ in ensemble mean, variance, skew and kurtosis, as well as power spectral density and partial autocorrelation functions.

As is shown in FIG. 5B, a time series $X(p, t)$ derived from data obtained from any source may be modeled as including an average wind speed $M(p)$ at a position p and a stochastic component $R(p, t)$ representing random flows, or gusts, at the position p and at any given time t. Therefore, a random process generator that may produce a normalized value of the stochastic component $R(p, t)$ is desired in order to model wind flows at any given position and any given time.

Figure 5C:
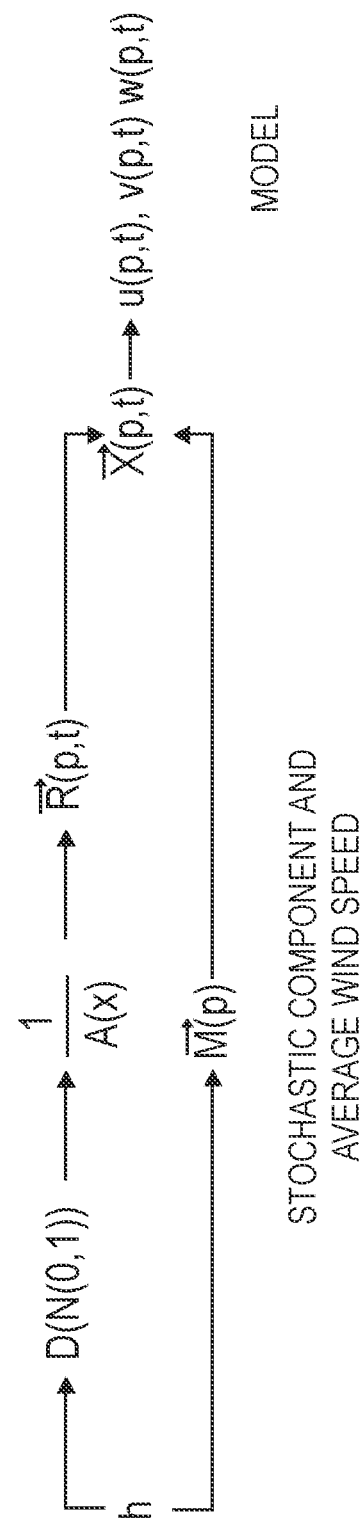

As is shown in FIG. 5C, for every position p, a normal white noise process $N(0, 1)$, a static nonlinearity $D(x)$ and an autoregressive filter $1/A(x)$ are selected. The stochastic component $R(p, t)$ may be obtained by providing the normal white noise process N(0, 1) to the autoregressive filter 1/A(x) via the static nonlinearity D(x), while the average wind speed M(p) for the position p may be obtained from a lookup table or in any other manner. The autoregressive filter 1/A(x) may be defined by a set of coefficients determined by a trained copula (e.g., a Gaussian copula, or any other type or form of copula or other multivariate cumulative distribution function). Based on the average wind speed M(p) and the stochastic component R(p, t), a model may be trained to generate a wind flow X(p, t) having components u(p, t), v(p, t), w(p, t).

As is shown in FIG. 5D, the model is configured to generate a time series of wind flows having the components u(p, t), v(p, t), w(p, t) along the u-axis, the v-axis and the w-axis based on coefficients determined by a trained copula and past values of the time series. In particular, the model is configured to generate a wind velocity u(p, t) along a u-axis as a sum of a random component and the average wind speed along the u-axis, or M(u). The random component may be calculated as of a product of a standard deviation $\sigma_u$ along the u-axis and a sum, from i=1 to k, where k is an order of the autoregressive model, of products of coefficients $\alpha_i$ and past values of the wind velocities u(t−i), and randomly sampled white noise values $\in_{u,t}$. Likewise, the model is further configured to generate a wind velocity v(p, t) along a v-axis as a sum of a random component and the average wind speed along the v-axis, or M(v). The random component may be calculated as of a product of a standard deviation $\sigma_v$ along the v-axis and a sum, from i=1 to k, where k is the order of the autoregressive model, of products of coefficients $b_i$ and past values of the wind velocities v(t−i), and randomly sampled white noise values $\in_{v,t}$. The model is also configured to generate a wind velocity w(p, t) along a w-axis as a sum of a random component and the average wind speed along the w-axis, or M(w). The random component may be calculated as of a product of a standard deviation $\sigma_w$ along the w-axis and a sum, from i=1 to k, where k is an order of the autoregressive model, of products of coefficients $c_i$ and past values of the wind velocities w(t−i), and randomly sampled white noise values $\in_{w,t}$. Each of the sets of coefficients $\alpha_1 \ldots \alpha_p$, $b_1 \ldots b_p$, $c_1 \ldots c_p$ is determined by the trained copula as a function of the position p or any other information or data.

Figure 6:
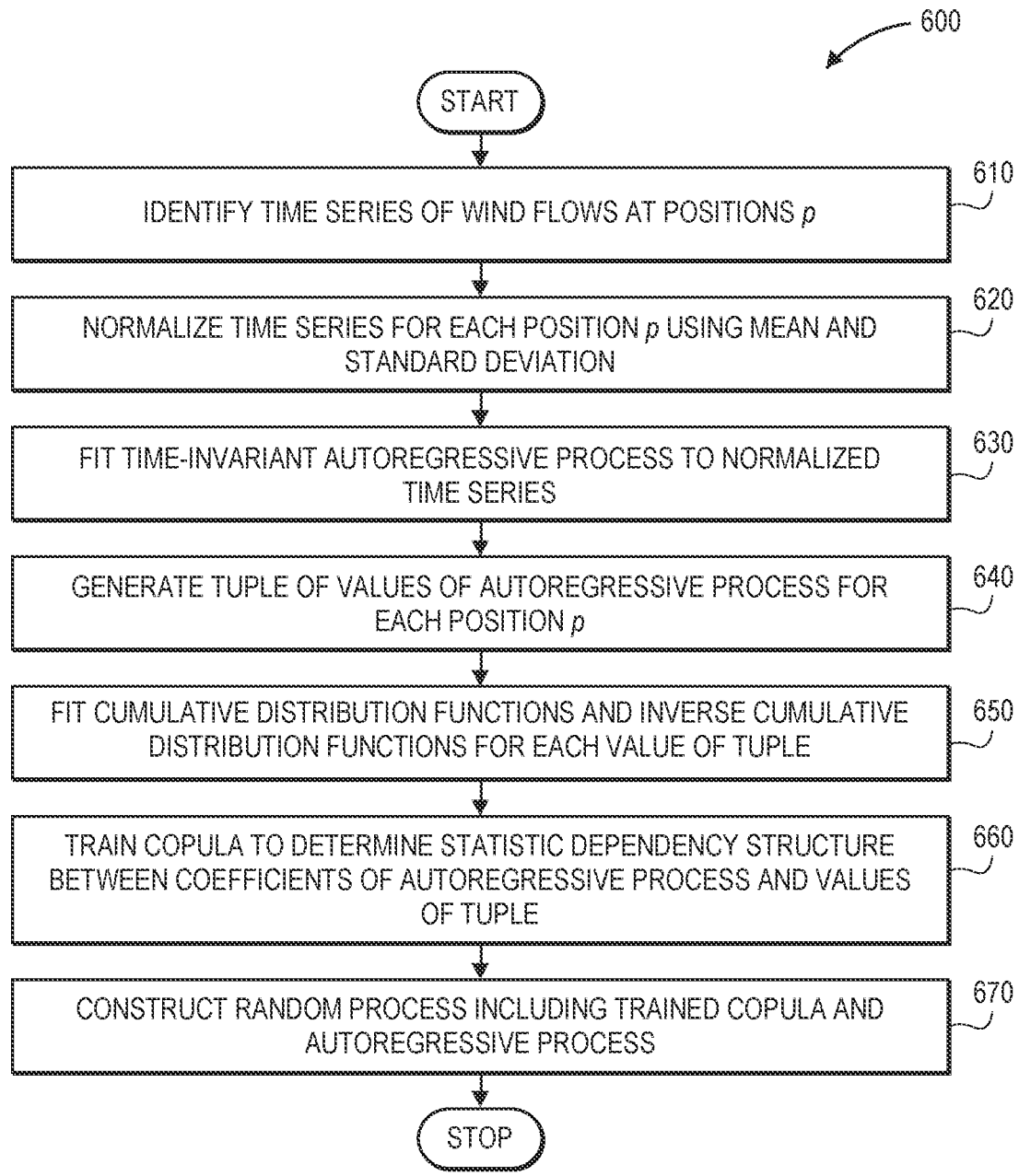
FIG. 6 is a flow chart of one process for modeling low-altitude turbulence in accordance with implementations of the present disclosure.

Referring to FIG. 6, a flow chart 600 of one process for modeling low-altitude turbulence in accordance with implementations of the present disclosure is shown.

At box 610, a time series of wind flows at various positions p is identified. The time series may include any set of observations at a time t in a set of times T, and may have been generated in any manner. For example, in some implementations, the time series may represent wind flow conditions, e.g., velocities, at various points within a domain representing an environment, and may be actual or simulated, e.g., a large-eddy simulation. The time series may take a form of:

$$X(t,h) = u(t,h), v(t,h), w(t,h)$$

where u, v and w are velocity values representing the wind flows at a time t and at a position p along orthogonal axes in forward, lateral (or side-to-side) and vertical (or up and down) directions, e.g., a u-axis, a v-axis and a w-axis.

At box 620, the time series identified at box 610 is normalized for each position p, using means and standard deviations of the wind flows. For example, where each of the wind flows is represented as velocities along orthogonal axes, the wind flows may be normalized by dividing differences between the velocities and mean velocities along each of such axes by standard deviations of the velocities along each of such axes, or $$(u(t)-\mu_u)/\sigma_u^2, (v(t)-U_v)/\sigma_v^2, (w(t)-\mu_w)/\sigma_w^2$$

where $\mu_u$, $\mu_v$ and $\mu_w$ are mean velocity values and $\sigma_u$, $\sigma_v$ and $\sigma_w$ are standard deviation values for the wind flows along the orthogonal axes, e.g., a u-axis, a v-axis and a w-axis.

At box 630, a time-invariant autoregressive process is fit to the normalized time series. For example, where X represents a vector of velocities along the three orthogonal axes, a vector $X_{k+1}$ may be determined by multiplying a state-transition matrix $\Phi(k)$ that is indexed by k and depends on a plurality of coefficients by a vector $X_k$, and adding to the product a vector Z representing uncorrelated normal white noise, or $$X_{k+1} = \Phi(k) X_k + Z_k$$

Thus, where the state-transition matrix depends on eighteen coefficients, a time series may be represented as a characteristic equation of $$X_t = Z_t - A_1 X_{t-1} - A_2 X_{t-2} - A_3 X_{t-3} - A_4 X_{t-4} - A_5 X_{t-5} - A_6 X_{t-6}$$

where $A_1 \ldots A_6$ represent coefficients that define the autoregressive process, e.g., of order six. Alternatively, the autoregressive process may be of any other order.

In some implementations, the characteristic equation may be converted to a zero-pole-gain representation, thereby enabling a determination as to the stability of the autoregressive process. Thus, where the autoregressive process is of an order six, the coefficients may be redefined in accordance with the following:

$$X/Z = 1/(z-\alpha_1)(z-\alpha_2) \ldots (z-\alpha_6)$$

where $\alpha_1 \ldots \alpha_6$ represent complex numbers having magnitudes less than one, or $|\alpha_i| \leq 1$.

At box 640, a tuple of values of the autoregressive process is generated for each position p. For example, a tuple may include the altitude h, as well as values of each of the coefficients $A_1 \ldots A_6$ for time series along the respective u-axis, v-axis and w-axis, or $\alpha_1 \ldots \alpha_6$ for the u-axis, $b_1 \ldots b_6$ for the v-axis, and $c_1 \ldots c_6$ for the w-axis, and means and standard deviations of the wind flows along the respective u-axis, v-axis and w-axis, or $\mu_u$, $\mu_v$ and $\mu_w$, and $\sigma_u$, $\sigma_v$ and $\sigma_w$.

At box 650, cumulative distribution functions and inverse cumulative distribution functions are fit for each value of the tuples generated at box 640.

At box 660, a copula is trained to determine a statistic dependency structure between the coefficients of the autoregressive process and the values of the tuple. A copula is a multivariate distribution function that "couples" marginal distributions of each of the variables of a tuple, e.g., coordinates or altitudes of each of the positions p, and models the dependence of random process parameters on each other and at each position.

Thus, for each time series, which includes wind velocities at N different altitudes, six coefficients are calculated for each of the wind axes, viz., $\alpha_1 \ldots \alpha_6$ for the u-axis, $b_1 \ldots b_6$ for the v-axis, and $c_1 \ldots c_6$ for the w-axis.

The copula uses the marginal distributions for the values of each of the tuples at each position p to model altitude-dependent joint distributions.

The copula may be Gaussian in nature, and may be defined by a correlation matrix R having dimensions of $[3(k+2)+1] \times [3(k+2)+1]$, where k is an order of the autoregressive model, such as six, or any other order.

Likewise, the cumulative distribution functions may be a set of 3 (k+2)+1 tabulated empirical cumulative distribution functions based on various factors, including not only altitudes h but also mean velocities $\mu_u$, $\mu_v$ and $\mu_w$, standard deviations in velocities $\sigma_u$, $\sigma_v$ and $\sigma_w$, and coefficients $\alpha_1 \ldots \alpha_6$ for the u-axis, $b_1 \ldots b_6$ for the v-axis, and $c_1 \ldots c_6$ for the w-axis.

The copula may be sampled to preserve dependencies between variables at arbitrary altitudes, using the correlation matrix R.

At box 670, a random process including the trained copula and the autoregressive process is constructed, and the process ends. The random process may then be utilized as a time series of data representing wind flows at a plurality of positions within an environment. The random process may be further utilized to calculate wind flows at positions other than the plurality of positions within the environment, e.g., by interpolation, and in determining whether to attempt or complete a mission using one or more aerial vehicles.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, one or more of the systems or methods disclosed herein may be used to identify or select locations within or near urban environments for placing wind turbines or other systems or equipment that rely on wind flows for operations, or to select an optimal urban environment for such systems or equipment. Such locations may be selected based on simulations of wind flow through surrogate environments that share one or more parameters or attributes in common with the urban environments, or that are sufficiently similar to the urban environments. Similarly, one or more of the systems or methods disclosed herein may be used to identify or select locations for planting trees, installing signage, or constructing buildings or communications towers, or placing any other objects that may be affected by wind flows. Applications of the systems and methods of the present disclosure are not limited to any of the individual embodiments described herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow charts of FIGS. 3 and 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
  a computer system having one or more computer processors and one or more data stores; and
  at least one aerial vehicle in communication with the computer system,
  wherein the computer system is programmed with one or more sets of instructions that, when executed, cause the computer system to execute a method comprising:
    identifying a time series of wind flow data, wherein the time series comprises a plurality of wind velocities at a plurality of locations, wherein each of the wind velocities is stored in association with an altitude of one of the plurality of locations;
    normalizing the time series;
    fitting a first autoregressive process to the normalized time series, wherein the first autoregressive process is of a predetermined order, and wherein the first autoregressive process is defined by coefficients;

generating tuples of values of the coefficients of the autoregressive process corresponding to each of the altitudes;

fitting cumulative density functions to variables of the tuples;

training a copula based at least in part on the cumulative density functions;

constructing a random process model based at least in part on the trained copula and at least a portion of the first autoregressive process;

identifying a mission for travel by the at least one aerial vehicle;

determining information regarding a route for travel by the at least one aerial vehicle during a performance of the mission, wherein the route is defined by a plurality of waypoints, and wherein the information regarding the route comprises coordinates and altitudes of each of the plurality of waypoints;

providing the coordinates and altitudes as inputs to the random process model; and predicting, by the random process model, wind velocities at each of the plurality of waypoints based at least in part on outputs received from the random process model in response to the inputs.

2. The system of claim 1, wherein the method further comprises:

determining that a first aerial vehicle may perform the mission based at least in part on the predicted wind velocities; and transmitting one or more instructions to the first aerial vehicle,
wherein the one or more instructions identify at least one of the route or the plurality of waypoints.

3. The system of claim 2, further comprising:

receiving, from the first aerial vehicle during the mission, data representing wind flows at a plurality of positions;

training the copula based at least in part on the data representing the wind flows; and generating coefficients for a second autoregressive process by the trained copula.

4. The system of claim 1, wherein the time series of wind flow data comprises:

coordinates in three-dimensional space for each of the plurality of locations;

altitudes above a ground surface for each of the plurality of locations;

wind flows along three orthogonal axes for each of the plurality of locations;

air temperatures for each of the plurality of locations;

a density of surface features on the ground surface; and an average height of the surface features on the ground surface.

5. The system of claim 1, wherein the copula is a Gaussian copula trained to approximate the cumulative distribution functions by a correlation matrix, and
wherein the predetermined order is a sixth order.

6. A method comprising:

determining information regarding a first mission requiring a first aerial vehicle to fly from an origin to a destination within an environment;

identifying a first plurality of positions within the environment, wherein each of the first plurality of positions is above a ground surface within the environment;

determining a first time series of data regarding the environment, wherein the first time series comprises data regarding wind velocities at each of the first plurality of positions;

predicting average velocities at each of the first plurality of positions;

selecting normal distributions of white noise for each of the first plurality of positions;

providing at least the normal distributions of the white noise for each of the first plurality of positions as inputs to an autoregressive filter characteristic polynomial, wherein the autoregressive filter characteristic polynomial is of a predetermined order, and wherein the autoregressive filter characteristic polynomial is configured to determine a stochastic wind velocity component for each of the plurality of positions based at least in part on the first time series;

generating a second time series of data regarding the environment based at least in part on the average velocities at each of the first plurality of positions and outputs received from the autoregressive filter characteristic polynomial in response to the inputs, wherein the second time series comprises data regarding wind velocities at each of the first plurality of positions; and determining whether the first aerial vehicle may perform the first mission based at least in part on the second time series.

7. The method of claim 6, further comprising:

determining that the first aerial vehicle may perform the first mission based at least in part on the second time series; and transmitting one or more instructions to the first aerial vehicle,
wherein the one or more instructions identify a route having a plurality of waypoints to be traveled by the first aerial vehicle during the performance of the first mission.

8. The method of claim 7, wherein determining that the first aerial vehicle may perform the first mission based at least in part on the second time series comprises:

determining wind flows at each of the plurality of waypoints based at least in part on the second time series, wherein at least one of the wind flows is determined by interpolation from the second time series; and determining that each of the wind flows is below a predetermined threshold.

9. The method of claim 6, further comprising:

generating the autoregressive filter characteristic polynomial by a copula based at least in part on the first time series of data regarding the environment.

10. The method of claim 9, wherein the copula is a Gaussian copula trained to approximate marginal cumulative distribution functions by a correlation matrix.

11. The method of claim 9, wherein the autoregressive filter characteristic polynomial is a sixth-order polynomial having a plurality of coefficients generated by the copula.

12. The method of claim 9, further comprising:

receiving, from the first aerial vehicle within the environment, data representing wind flows at a second plurality of positions within the environment;

training the copula based at least in part on a third time series of data regarding the environment, wherein the third time series of data comprises the data representing the wind flows at the second plurality of positions; and updating the autoregressive filter characteristic polynomial based at least in part on the trained copula.

13. The method of claim 12, further comprising:
providing at least the normal distributions of the white noise for each of the first plurality of positions as inputs to the updated autoregressive filter characteristic polynomial;
generating a fourth time series of data regarding the environment based at least in part on the average velocities at each of the first plurality of positions and outputs received from the updated autoregressive filter characteristic polynomial in response to the inputs, wherein the fourth time series comprises data regarding wind velocities at each of the first plurality of positions; and
determining whether one of the first aerial vehicle or a second aerial vehicle may perform a second mission based at least in part on the fourth time series.

14. The method of claim 6, wherein each of the wind velocities at each of the first plurality of positions was determined by one of:
a computational flow dynamics analysis;
at least one anemometer; or
a sensor provided aboard one of the first aerial vehicle or a second aerial vehicle operating in the environment.

15. The method of claim 6, wherein the first time series of data comprises:
coordinates in three-dimensional space for each of the plurality of positions;
altitudes above the ground surface for each of the plurality of positions;
wind flows along three orthogonal axes for each of the plurality of positions; and
air temperatures for each of the plurality of positions.

16. The method of claim 15, wherein the first time series of data further comprises:
a density of surface features on the ground surface; and
an average height of the surface features on the ground surface.

17. The method of claim 6, wherein providing at least the normal distributions of the white noise for each of the plurality of positions as the inputs to the autoregressive filter characteristic polynomial comprises:
providing the normal distributions of the white noise as inputs to a static nonlinearity; and
receiving outputs from the static nonlinearity,
wherein the outputs of the static nonlinearity are provided as the inputs to the autoregressive filter characteristic polynomial.

18. A method comprising:
identifying a first time series of wind velocities, wherein each of the wind velocities of the first time series is a velocity of wind at one of a first plurality of positions at a first time;
determining components of each of the wind velocities of the first time series about each of a plurality of orthogonal axes;
normalizing the first time series of wind velocities about each of the plurality of orthogonal axes;
fitting a first autoregressive process to the normalized first time series;
generating tuples of values based at least in part on the first autoregressive process, wherein each of the tuples of values is generated for one of the first plurality of positions, and wherein each of the tuples of values comprises the one of the first plurality of positions, mean velocities along each of the plurality of orthogonal axes, standard deviations of velocities along each of the plurality of orthogonal axes, and coefficients of the first autoregressive process corresponding to each of the velocities of the first time series;
training a copula to determine dependencies between each of the coefficients of the first autoregressive process and the first plurality of positions;
constructing a second autoregressive process, wherein the second autoregressive process comprises a plurality of coefficients selected based at least in part on the copula; and
predicting a second time series of wind velocities by the second autoregressive process, wherein each of the wind velocities of the first time series is a velocity of wind at one of a second plurality of positions at a second time.

19. The method of claim 18, further comprising:
determining that a first aerial vehicle may perform a first mission based at least in part on the second time series; and
transmitting one or more instructions to the first aerial vehicle,
wherein the one or more instructions identify a route having a plurality of waypoints to be traveled by the first aerial vehicle during the performance of the first mission.

20. The method of claim 18, wherein each of the wind velocities of the first time series was determined by one of:
a computational flow dynamics analysis;
at least one anemometer; or
a sensor provided aboard one of the first aerial vehicle or a second aerial vehicle operating in the environment at the first time.

* * * * *